United States Patent
Bruinooge et al.

(10) Patent No.: US 9,113,303 B2
(45) Date of Patent: Aug. 18, 2015

(54) TRACKING APPARATUS

(71) Applicant: 6317414 Manitoba Ltd., Winnipeg (CA)

(72) Inventors: Rod Bruinooge, Winnipeg (CA); Chantale Bruinooge, Winnipeg (CA); Blake Friesen, Winnipeg (CA); Rick Baril, Winnipeg (CA); Kristjan Peterson, Winnipeg (CA); Howard Gin, Winnipeg (CA)

(73) Assignee: 6317414 Manitoba Ltd, Winnipeg, MB (CA)

( * ) Notice: Subject to any disclaimer, the term of this patent is extended or adjusted under 35 U.S.C. 154(b) by 0 days.

(21) Appl. No.: 13/937,346

(22) Filed: Jul. 9, 2013

(65) Prior Publication Data
US 2014/0155107 A1 Jun. 5, 2014

Related U.S. Application Data

(60) Provisional application No. 61/732,990, filed on Dec. 4, 2012.

(51) Int. Cl.
| | |
|---|---|
| *H04W 24/00* | (2009.01) |
| *H04W 4/02* | (2009.01) |
| *H04L 29/06* | (2006.01) |
| *A63F 13/216* | (2014.01) |
| *A63F 13/332* | (2014.01) |

(52) U.S. Cl.
CPC ............. *H04W 4/023* (2013.01); *A63F 13/216* (2014.09); *A63F 13/332* (2014.09); *H04L 67/38* (2013.01); *H04W 4/028* (2013.01)

(58) Field of Classification Search
CPC ....... H04L 67/38; H04W 4/023; H04W 4/028
USPC ............. 455/412.1, 419–422.1, 552.1, 456.1, 455/456.6
See application file for complete search history.

(56) References Cited

U.S. PATENT DOCUMENTS

| | | | |
|---|---|---|---|
| 8,282,491 B2 | 10/2012 | Auterio et al. | |
| 2008/0146338 A1* | 6/2008 | Bernard et al. | 463/42 |
| 2012/0244945 A1 | 9/2012 | Kolo et al. | |

* cited by examiner

*Primary Examiner* — Babar Sarwar
(74) *Attorney, Agent, or Firm* — Adrian D. Battison; Ade & Company Inc

(57) ABSTRACT

An apparatus is provided for gaming or for other purposes where tracking of the relative location of a plurality of individuals can be used which includes for each person a wireless network device connected to a network. Each device detects a current location of the device while being carried for communication to a server arranged to communicate through the network with each of the devices having a downloaded program to obtain repeatedly an indication of the current location of the device. The server detects from the current locations when any two or more of the devices are within a predetermined distance and communicates to at least one of the devices when the location is within said predetermined distance. The signal can be used to trigger various events including actions in a gaming situation.

13 Claims, 1 Drawing Sheet

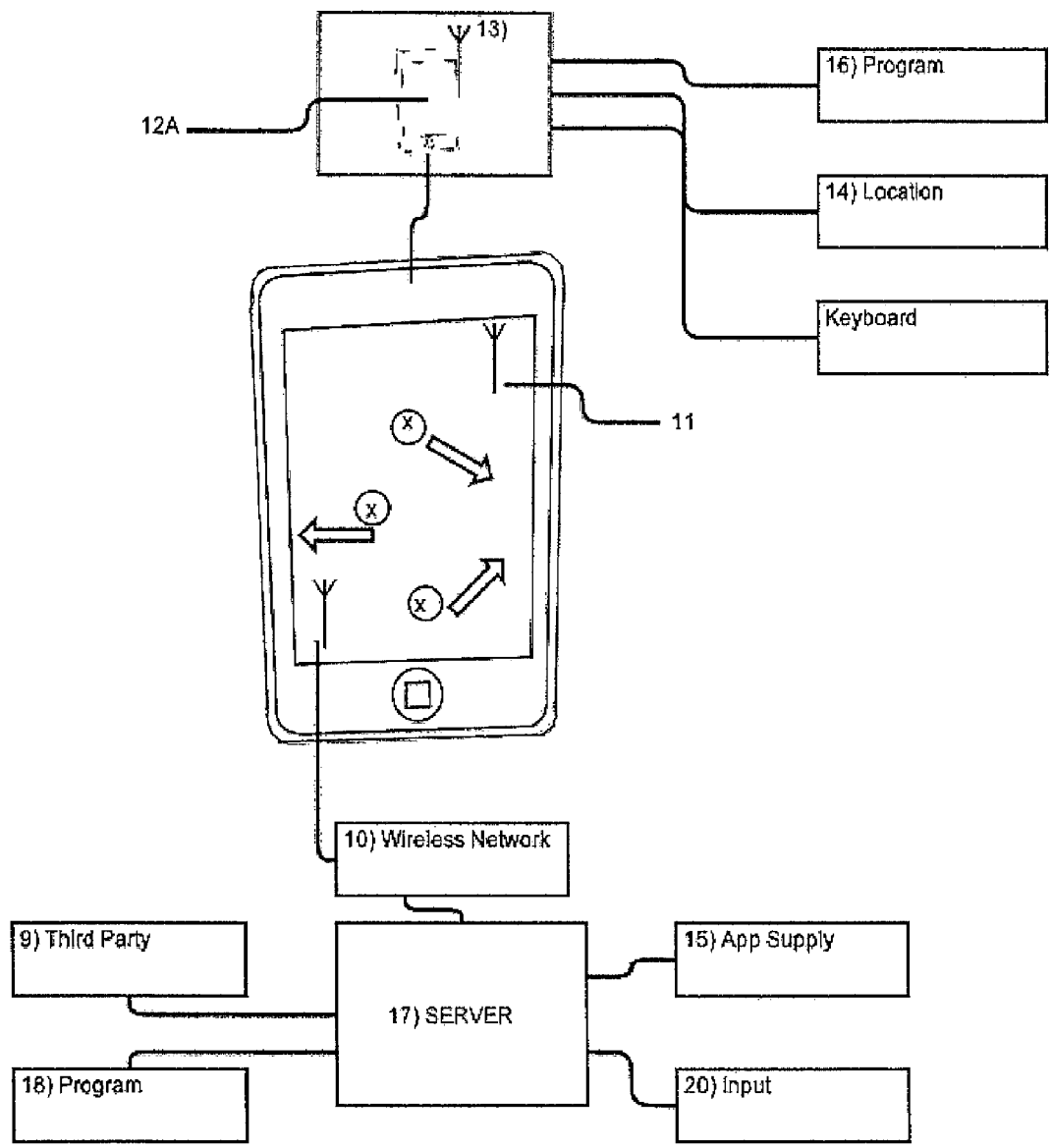

TRACKING APPARATUS

This application claims the benefit under 35 USC 119 (e) of Provisional Application 61/732,990 filed Dec. 4 2012.

This invention relates to an apparatus for tracking the relative location a plurality of individuals for providing information to the individuals.

SUMMARY OF THE INVENTION

According to the invention there is provided an apparatus for tracking the relative location a plurality of individuals for providing information to the individuals, the apparatus comprising:

a plurality of wireless network devices each arranged to be carried by one individual of the plurality of individuals;

a wireless network communication network for communication with the wireless network devices;

each wireless network device having a location detection system for detecting a current location of the wireless network device while being carried;

a server providing a downloadable program which can be communicated to a selected plurality of the wireless network devices for controlling operation of the wireless network device;

a server having an operating program in communication with the network;

the server being arranged to communicate through the network with each of the wireless network devices having the downloaded program to obtain repeatedly from those wireless network devices an indication of the current location of the respective wireless network devices;

the server being arranged to detect from said indications of the current location when any two or more of those wireless network devices have the location thereof within a predetermined distance;

the server being arranged to communicate through the network a signal to at least one of said two or more of those wireless network devices when the location thereof is within said predetermined distance.

Preferably the server is arranged to communicate through the network a signal to both or all of said two or more of those wireless network devices when the location thereof is within said predetermined distance. However the signal can in some circumstances only be communicated to one of the parties.

Preferably said predetermined distance between the parties triggering the sending of the signal can be changed to different values depending upon various circumstances. The distance can be changed globally for all parties or individuals involved or can be set for different values for different individuals. This can be done by selection of a setting on the program of the server or can be changed by selection of a setting on the downloaded program on one or more of the wireless network devices. Thus all parties to the system may use the same distance or all may have different distances. The parties or the system may set the distances as different values for different ones of the parties. The distances can also be changed temporarily for different circumstances.

Preferably the server is arranged to communicate through the network to one or more of the wireless network devices having the downloaded program a map on which the current locations of some or all of the wireless network devices having the downloaded program are identified. That is in addition to the signal indicating the proximity of the parties, some or all of the parties can also have a real time map indicating the location of the other parties to the system. This map may also identify the parties concerned or may just provide their location without any identification.

Where the communication is provided only to selected ones of the parties or participants, the list of the selected ones can be changed by selection of a setting on the program of the server or it can be changed by selection of a setting on the downloaded program on one or more of the wireless network devices. That is the system at the server level may select the parties to be included in the communication. In an alternative arrangement, individual parties may select the other ones to receive information as their location.

Typically the system is used so that the server requires the individual having the wireless network device which receives the signal to carry out a function as indicated by the server. That is in a case where both parties to the proximity event are informed, both are typically required by the system as a result of the proximity event to carry out a predetermined function. However, only one may be required to carry out that function. Typically the function involves an interaction with the other party.

The function to be carried out may be carried out by by communicating with the server through the network. However this is not necessary and the function may relate only to the two parties without the communication passing through the server and the network. Thus the function may involve an actual meeting and intercourse between the parties. Or the function may be wholly carried out by communication through the network, either directly through the network without involving the server or in a communication which involves and is monitored, controlled and recorded by the server.

Typically the server initiates two-way communications between two or more of those wireless network devices when the location thereof is within the predetermined distance.

Typically a message is displayed to two or more of those wireless network devices when the location thereof is within the predetermined distance so that the users can initiate communications with at least one of the other users located within said predetermined distance. Again this can be through the server or direct.

This arrangement as defined above can be used in many different end uses and the system for doing this can be tailored to a required end use by suitable modifications to and setting on the server.

One particular end use is in the field of gaming where the server controls a game set up between the individuals or participants. That is all of the participants are members of a game situation competing against one another individually or in teams. The server therefore not only monitors the location of the parties and provides the signals of a proximity event and also if required the mapped location information, but also monitors the interactions between the parties to determine the progress and outcome of the game. The game may depend wholly on the interactions resulting from the signals or may include other complications and events unrelated to the proximity events.

Typically the server is arranged to require the individual who receives the signal to carry out a function in the game by communicating with the server through the network and/or with the other participant or participants to the proximity event. In most cases to maintain the control by the server, the communication takes place through the server with data communicated to both parties by the server. However this is not essential and the parties may carry out the event or function independently of the server and merely report back to the server the outcome.

In a simple gaming situation the function may be a simulated combat situation such as a simple interactive game. Thus both parties may carry out a function leading to a winner and loser to the interaction which is then communicated to or determined by the server so that the server can apply the results to the status of the participants in the game.

The game can be managed by the server providing for each of the individuals a number of tokens or "lives" and the server changes the number of tokens or "lives" of one or both individuals as a result of the combat action. That is a winner may receive additional tokens and the loser may lose tokens leading to an eventual winner having the most tokens or a loser having zero tokens. While the two individuals remain in the proximity locations, further combat actions or other interactions in the game may occur at the instigation of the server or of one or other of the individuals. The server can also be arranged to release one or both of the individuals from carrying out the function in the game in the event that one of both of the individuals moves to a location further spaced from the other individual. That is one of both can run away to a new further spaced location to avoid the combat it this fits with the strategy of the player.

The gaming function is particularly suited to a multiplayer proximity game to be used in a large crowd event such as in a football stadium, baseball stadium, hockey arena, soccer stadium or indoor/outdoor concert. In this situation the likelihood of persons coming into proximity is increased due to the large number of persons attending. Of course the setting of the distance takes into account the size of the venue so that the predetermined distance set is significantly less than the dimensions of the venue and significantly smaller than a distance set where the person participating in the game are not confined to a particular venue.

Another end use is in the field of social networking where the system acts to manage interactions between individuals on the basis of their moving to a position of proximity as explained above. That is on this case the downloaded program relates to a tracking of members of a selected group of the individuals and the server is arranged to allow individuals to select to become members of the group.

In this arrangement, the predetermined distance required to effect a trigger between two individuals can be changed by selection of a setting on the downloaded program and/or on one or more of the wireless network devices of individuals of the group. Thus members of the group may have individually set trigger distances and these may be the same between that individual and all other members of the group or it may be different for different members.

Also the server is arranged to communicate through the network to selected ones of the individuals of the group a map on which the current locations of selected ones of the wireless network devices of the group are identified. The list of the selected ones of the individuals of the group which receive the locations on the map can be changed by selection of a setting on the downloaded program on one or more of the wireless network devices of the group. Thus some individuals may choose not to be identified on some or all of the maps of the others while others may choose to be on all.

Another end use is in the field of utility functions where the downloaded program relates to a tracking of members of a predetermined group of the individuals, the group being related by a common identifier input to the server by a representative of the group. That is the system is used to manage the location of employees or volunteers working for a selected organization. In this case the server can be arranged to communicate through the network a signal to a third party instead of or as well as the individuals when any two or more of the associated wireless network devices have the location thereof within the predetermined distance.

This arrangement can be used for being able to track the proximity of certain civic employees, or moving civic equipment for consumer benefit. For example, a consumer would be able to gauge the proximity of a city bus relative to your position, or from a private sector commercial perspective the closest plumber or taxi etc. As the manager of employees who work outside of the office, such as plumbers. It would be of value to know which two are most proximate to each other for the purpose of reallocating to another job.

BRIEF DESCRIPTION OF THE DRAWINGS

One embodiment of the invention will now be described in conjunction with the accompanying drawings in which FIG. 1 is a schematic illustration of the system of the present invention.

DETAILED DESCRIPTION

In FIG. 1 is shown an apparatus for tracking the relative location a plurality of individuals for providing information to the individuals.

The apparatus includes a wireless network system including a central server 10 communicating through a series of wireless network towers 11 with a plurality of wireless network devices 12 each arranged to be carried by one individual of a plurality of individuals. The individuals are selected to be part of a group. The wireless network system also communicates in conventional manner with other subscribers who are not part of the group concerned but maybe part of another unrelated group.

Each wireless network device 12 has an antenna 13 forming part of a location detection system or programme 14 for detecting a current location of the wireless network device while being carried. Each wireless network device can download programs or "apps" from an APP supply 15 onto a processor 16 of the device 12 which can be communicated to a selected plurality of the wireless network devices of a group for controlling operation of the wireless network device of the members of the group.

The system further includes a server 17 having an operating program 18 in communication with the network.

The server 17 is arranged to communicate through the network, independently of any other communications that may in progress over the network between the devices 12, with each of the wireless network devices 12 having the downloaded program to obtain repeatedly from those wireless network devices an indication of the current location of the respective wireless network As determined by the location program 14.

The server 17 acts using a program 18 to track the locations of all of the devices 12 associated with the group by the downloading of the app and to supply to all of the associated devices a map 12A of the area containing some or all of the associated devices 12 which is displayed on the screen of the devices 12.

The server program 18 is arranged to detect from the tracked indications of the current location of all of the associated devices when any two or more of those wireless network devices have the location thereof within a predetermined distance.

The server 17 is also arranged to communicate through the network a signal to one or both of those wireless network devices and/or to a third party 19 when the location thereof is within a predetermined distance.

The parameters of the system can be input into the individual devices 12 using the conventional input systems for communication to the server 17 which manages the system. In addition or alternatively the server 17 can be arranged for direct input of all parameters as described herein by the input 20.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An Apparatus for tracking the relative location of a plurality of individuals for providing information to the plurality of individuals, the apparatus comprising:

a plurality of wireless network devices each arranged to be carried by one individual of the plurality of individuals;

a wireless communication network for communication with the plurality of wireless network devices;

each of the plurality of wireless network devices having a location detection system for detecting a current location of the each of the plurality of wireless network devices while being carried;

a server providing a downloadable program which can be communicated to a selected wireless network devices of the plurality of wireless network devices for controlling operation of the plurality of wireless network devices;

the server having an operating program in communication with the wireless communication network;

the server being arranged to communicate through the wireless communication network with the each of the plurality of wireless network devices having the downloaded program to obtain repeatedly from the each of the plurality of wireless network devices an indication of the current location of the respective wireless network devices of the plurality of wireless network devices;

wherein the downloaded program is arranged to track members of a predetermined group of the individuals having the wireless network devices, the group being identified in the server by an identifier of the members of the group input to the server;

the server being arranged to detect from said indications of the current location whenever two or more of the plurality of wireless network devices have the current location thereof within a predetermined distance whether or not said two or more of the plurality of wireless network devices are at a common location;

the server being arranged to communicate through the wireless communication network a signal to at least one of said two or more of the plurality of wireless network devices whenever the current location thereof is within said predetermined distance;

wherein the server is arranged to communicate through the wireless communication network to the plurality of wireless network devices or selected ones of the plurality of wireless network devices of the individuals of the group a map on which the current locations of the plurality of wireless network devices or the selected ones of the plurality of wireless network devices of the group are identified whether or not said two or more of the plurality of wireless network devices are at said common location.

2. The apparatus according to claim 1 wherein the server is arranged to communicate through the wireless communication network a signal to both or all of said two or more of the plurality of wireless network devices whenever the current location thereof is within said predetermined distance.

3. The apparatus according to claim 1 wherein said predetermined distance can be changed by selection of a setting on the downloadable program of the server.

4. The apparatus according to claim 1 wherein said predetermined distance can be changed by selection of a setting on the downloaded program on one or more of the plurality of wireless network devices.

5. The apparatus according to claim 1 wherein a list of the selected ones of the plurality of wireless network devices can be changed by selection of a setting on the downloadable program of the server.

6. The apparatus according to claim 1 wherein a list of the selected ones of the plurality of wireless network devices can be changed by selection of a setting on the downloaded program on one or more of the plurality of wireless network devices.

7. The apparatus according to claim 1 wherein the server is arranged to require the individual having the wireless network device which receives the signal to carry out a function.

8. The apparatus according to claim 1 wherein the server is arranged to require the individual having the wireless network device which receives the signal to carry out a function by communicating with the server through the wireless communication network.

9. The apparatus according to claim 1 wherein said server initiates two-way communications between said two or more of the plurality of wireless network devices when the current location thereof is within said predetermined distance.

10. The apparatus according to claim 1 wherein said message is displayed to said two or more of the plurality of wireless network devices when the current location thereof is within said predetermined distance so that the users can initiate communications with at least one of the other users located within said predetermined distance.

11. The apparatus according to claim 1 wherein the downloaded program relates to a game to be played by the individuals having the wireless network devices having the downloaded program and wherein the server is arranged to require the individual having the wireless network device which receives the signal to carry out a function in the game by communicating with the server through the wireless communication network.

12. The apparatus according to claim 11 wherein the server is arranged to require the individuals having the wireless network device which receive the signal to carry out a function in the game by communicating with the other individual through the wireless communication network.

13. The apparatus according to claim 1 wherein the server is arranged to communicate through the wireless communication network a signal to a third party when said any two or more of the plurality of wireless network devices have the current location thereof within said predetermined distance.

\* \* \* \* \*